US009568586B2

(12) United States Patent
Hu et al.

(10) Patent No.: US 9,568,586 B2
(45) Date of Patent: Feb. 14, 2017

(54) METHOD FOR POSITIONING A TO-BE-POSITIONED DEVICE

(71) Applicant: NATIONAL CHIAO TUNG UNIVERSITY, Hsinchu (TW)

(72) Inventors: Jwu-Sheng Hu, Zhubei (TW); Kuan-Chun Sun, Linnei Township (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 15/063,239

(22) Filed: Mar. 7, 2016

(65) Prior Publication Data
US 2016/0299209 A1 Oct. 13, 2016

(30) Foreign Application Priority Data
Apr. 13, 2015 (TW) .............................. 104111793 A

(51) Int. Cl.
G06F 19/00 (2011.01)
G01S 5/02 (2010.01)
G01C 21/20 (2006.01)

(52) U.S. Cl.
CPC ........... G01S 5/0284 (2013.01); G01C 21/206 (2013.01)

(58) Field of Classification Search
CPC ........... G01C 21/206; G01C 1/00; G01C 1/02; G01S 5/0284; G01S 1/00; H04B 1/707
(Continued)

(56) References Cited

U.S. PATENT DOCUMENTS 5,875,402 A * 2/1999 Yamawaki ............. H04B 7/212
370/350
6,163,294 A * 12/2000 Talbot ...................... G01C 1/02
33/292
(Continued)

FOREIGN PATENT DOCUMENTS

EP 2772815 A2 9/2014
TW I380047 B 12/2012
(Continued)

OTHER PUBLICATIONS

Yeh et al., Adaptive-Weighting Schemes for Location-based Services over Heterogeneous Wireless Networks, 2010, IEEE, p. 1-4.*
(Continued)

*Primary Examiner* — McDieunel Marc
(74) *Attorney, Agent, or Firm* — Lewis Roca Rothgerber Christie LLP

(57) ABSTRACT

A method for positioning a device includes the steps of: estimating an absolute distance between a reference point and the device at each of a current time point and a number (N) of consecutive previous time points, where N is a integer smaller than n, n is a non-negative integer indicating a total number of time points since the device starting to move, and the current time point is defined as the $(n)^{th}$ time point; estimating a unit vector of a movement direction of the device in each of $(n-N+1)^{th}$ to $(n)^{th}$ time periods; and estimating a coordinate of a location of the device at $(n)^{th}$ time point based on the absolute distance(s), the unit vector(s), and a coordinate of a location of the device at each of the number (N) of the consecutive previous time points.

9 Claims, 4 Drawing Sheets

(58) Field of Classification Search
USPC .................... 701/408; 342/351.61, 357.69
See application file for complete search history.

(56) References Cited

U.S. PATENT DOCUMENTS

| | | | |
|---|---|---|---|
| 6,236,673 B1* | 5/2001 | Julg | ................. G01S 19/22 342/357.61 |
| 8,185,135 B2 | 5/2012 | Gupta et al. | |
| 8,478,292 B2 | 7/2013 | Kim | |
| 8,587,478 B1 | 11/2013 | Kang et al. | |
| 8,588,512 B2 | 11/2013 | Yoon et al. | |
| 8,606,295 B2 | 12/2013 | Jang et al. | |
| 2010/0110412 A1 | 5/2010 | Basu et al. | |
| 2010/0256908 A1 | 10/2010 | Shimshoni | |
| 2012/0293550 A1 | 11/2012 | Lo et al. | |
| 2014/0120931 A1 | 5/2014 | Shin et al. | |
| 2014/0274128 A1 | 9/2014 | Baechler et al. | |

FOREIGN PATENT DOCUMENTS

| | | |
|---|---|---|
| TW | I397714 B1 | 6/2013 |
| TW | I412725 B | 10/2013 |

OTHER PUBLICATIONS

El-mowafy, Performance Analysis of an Alternative Technique for Relative Positioning by GPS, 2008, IEEE, p. 616-623.*

H. Sert, A. Kokosy, and W. Perruquetti, "A Single Landmark Based Localization Algorithm for Non-Holonomic Mobile Robots," in IEEE International Conference on Robotics and Automation, 2011, pp. 293-298.

A. Bais, R. Sablatnig, and J. Gu, "Single Landmark Based Self-Localization of Mobile Robots," in Proceedings of the 3rd Canadian Conference on Computer and Robot Vision (CRV'06)—vol. 00: IEEE Computer Society, 2006, 8 pp.

A. Bais, R. Sablatnig, J. Gu, and Y. M. Khawaja, "Location Tracker for a Mobile Robot," in Proceedings of the IEEE International Conference on Industrial Informatics, Jul. 2007, pp. 479-484.

A. Bais, R. Sablatnig, J. Gu, and S. Mahlknecht, "Active Single Landmark Based Global Localization of Autonomous Mobile Robots," in Proceedings of the International Conference on Visual Computing, ser. Lecture Notes in Computer Science, G. B. et al., Ed., No. 4291. Lake Tahoe, Nevada, USA: Springer-Verlag Berlin Heidelberg, Nov. 2006, pp. 202-211.

* cited by examiner

S31: estimating an absolute distance between reference point and to-be-positioned device at each of a current time point and a number ($N$) of consecutive previous time points before the current time point, where $N$ is an integer smaller than $n$, $n$ is a non-negative integer indicating a total number of time points accumulated since the to-be-positioned device starts to move

S32: when $N \geq 1$, estimating a unit vector of a movement direction of the to-be-positioned device in each of $(n-N+1)^{th}$ to $(n)^{th}$ time periods

S33:

S331: calculating a moving distance ($a_n$) that the to-be-positioned device has moved in the $(n)^{th}$ time period from the $(n-1)^{th}$ time point to the $(n)^{th}$ time point

S332: determining a measurement vector ($\mathbf{z}_n$) associated with the location of the to-be-positioned device

S333: determining a status vector ($\mathbf{x}_n$) associated with the moving distance of the to-be-positioned device in the $(n)^{th}$ time period to obtain the coordinates of the location of the to-be-positioned device at the $(n)^{th}$ time point in the two-dimensional Cartesian coordinate system

FIG.3

METHOD FOR POSITIONING A TO-BE-POSITIONED DEVICE

CROSS-REFERENCE TO RELATED APPLICATION

This application claims priority to Taiwanese Application No. 104111793, filed on Apr. 13, 2015.

FIELD

The disclosure relates to a method for positioning, more particularly to positioning a device with reference to a single reference point in indoor environments.

BACKGROUND

A conventional positioning method such as Global Positioning System (GPS) is useful in determining an object's location based on a distance between the object and each of at least three reference points, i.e., satellites. A triangulation positioning method is then implemented to obtain the object's location. However, when a GPS receiver is disposed indoors, satellite signals received by the GPS receiver may be weak, which results in difficulty in positioning the object.

SUMMARY

Therefore, an object of the present disclosure is to provide a positioning system that can position a to-be-positioned device with reference to a single reference point.

According to one aspect of the present disclosure, a method for positioning a to-be-positioned device, the method to be implemented by a positioning system that includes a distance estimating unit, an orientation estimating unit disposed on the to-be-positioned device, and a processing unit coupled to the distance estimating unit and the orientation estimating unit, the method includes the steps of:

a) estimating, by the distance estimating unit, an absolute distance between a reference point and the to-be-positioned device at each of a current time point and a number (N) of consecutive previous time points before the current time point, where N is an integer smaller than n, n is a non-negative integer indicating a total number of time points since the to-be-positioned device starting to move, the current time point is defined as the $(n)^{th}$ time point, a $(j)^{th}$ time period is defined as a time period between $(j-1)^{th}$ and $(j)^{th}$ time points, and j is an integer ranging from 1 to n;

b) estimating, by the orientation estimating unit, a unit vector of a movement direction of the to-be-positioned device in each of $(n-N+1)^{th}$ to $(n)^{th}$ time periods; and c) estimating, by the processing unit, coordinates of a location of the to-be-positioned device at the $(n)^{th}$ time point based on the absolute distance(s) estimated in step a), the unit vector(s) estimated in step b), and coordinates of a location of the to-be-positioned device at each of the number (N) of the consecutive previous time points.

BRIEF DESCRIPTION OF THE DRAWINGS

Other features and advantages of the present disclosure will become apparent in the following detailed description of the embodiment with reference to the accompanying drawings, of which:

FIG. 3 is a flow chart of the embodiment of the method for positioning the to-be-positioned device;

DETAILED DESCRIPTION

Figure 1:
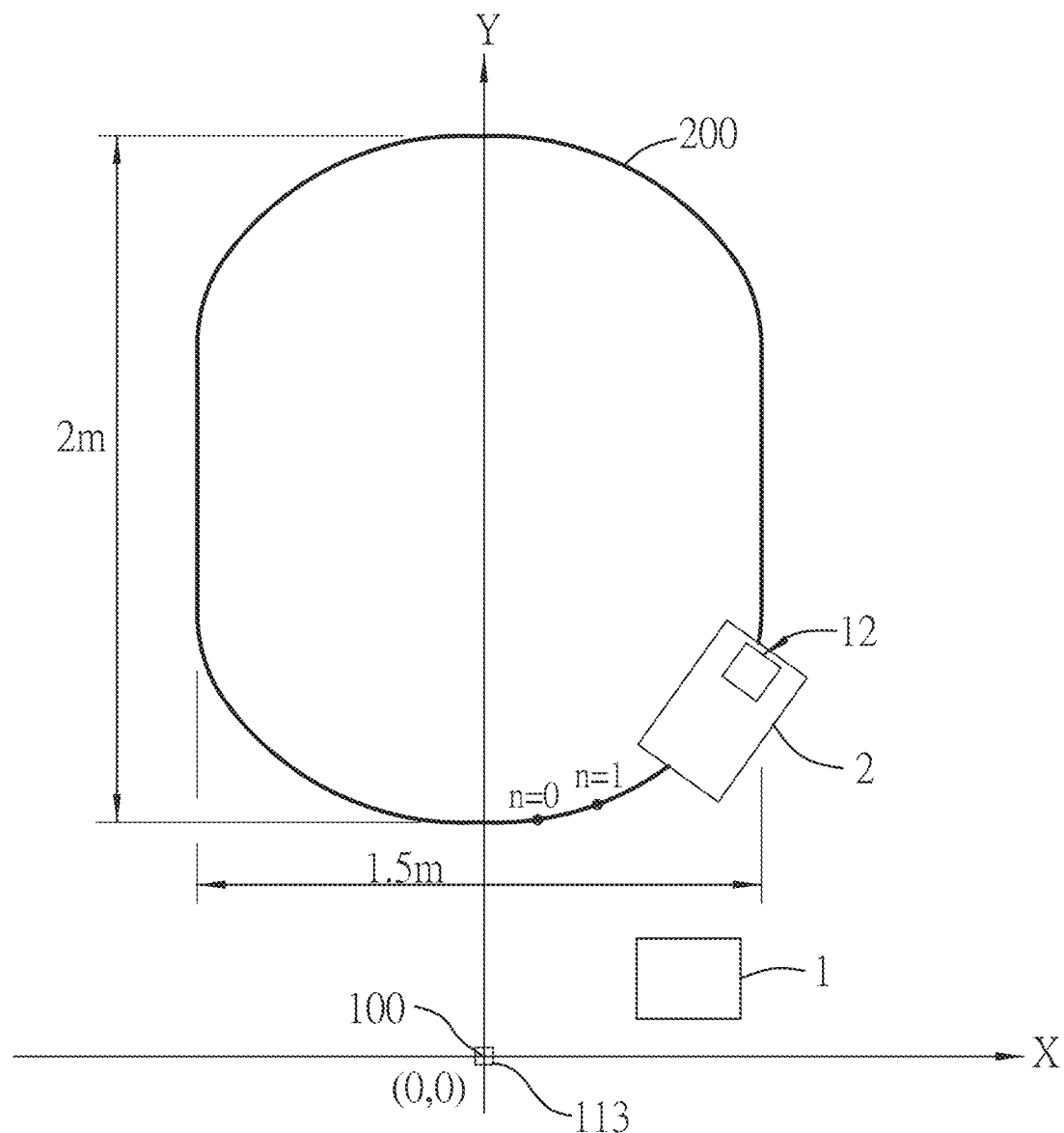
FIG. 1 is a schematic top view illustrating an indoor environment provided with a positioning system for performing an embodiment of a method for positioning a to-be-positioned device according to the present disclosure.
Figure 2:
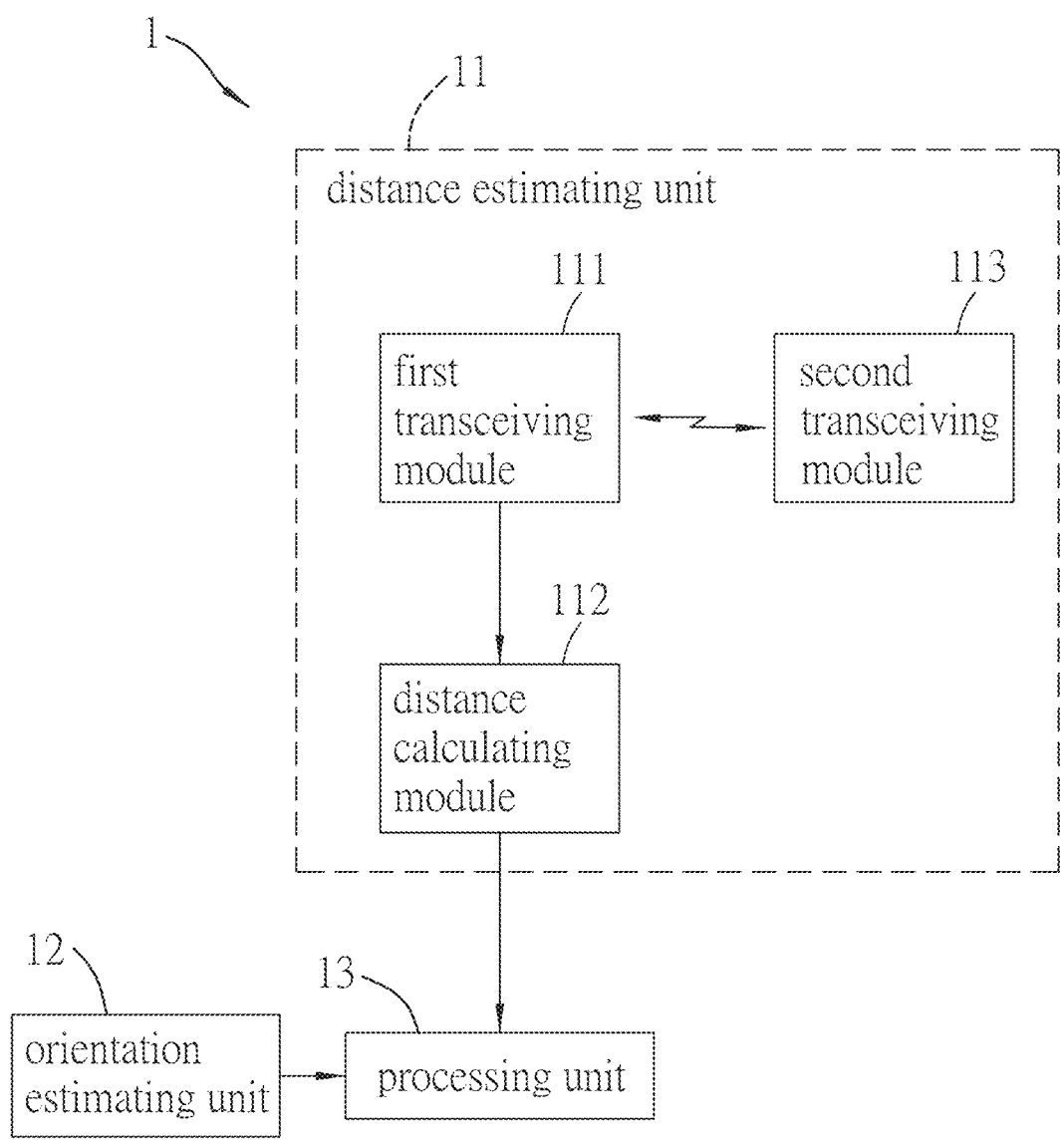
FIG. 2 is a schematic block diagram illustrating the positioning system.

Referring to FIGS. 1 and 2, the embodiment of a method for positioning a to-be-positioned device is implemented by a positioning system 1. The positioning system 1 includes a distance estimating unit 11, an orientation estimating unit 12 disposed on a to-be-positioned device 2 such as an automatic guided vehicle (AGV), and a processing unit 13 coupled to the distance estimating unit 11 and the orientation estimating unit 12. It should be noted that the processing unit 13 is disposed on the to-be-positioned device 2 in this embodiment, but may be disposed on a remote device and coupled to the distance estimating unit 11 and the orientation estimating unit 12 via a communication network in other embodiments of this disclosure.

The distance estimating unit 11 includes a first transceiving module 111 disposed on the to-be-positioned device 2, a distance calculating module 112 coupled to the first transceiving module 111, and a second transceiving module 113 disposed at a reference point 100.

The first transceiving module 111 is for transmitting a first wireless signal to the second transceiving module 113. The second transceiving module 113 transmits a second wireless signal to the first transceiving module 111 upon receipt of the first wireless signal. The distance calculating module 112 calculates a distance between the to-he-positioned device 2 and the reference point 100 according to a time difference between transmission of the first wireless signal by the first transceiving module 111 and reception of the second wireless signal by the first transceiving module 111. In this embodiment, the first and second wireless signals are ultrasonic signals, but the disclosure is not limited to this aspect in that the first and second wireless signals may be infrared signals, radar signals and radio signals.

The orientation estimating unit 12 includes an inertial sensor in this embodiment, and may include an electronic compass in other embodiments of this disclosure.

Further referring to FIG. 3, an embodiment of the method implemented by the positioning system 1 for positioning the to-be-positioned device 2 according to the embodiment of this disclosure is described in the following.

In step S31, the distance estimating unit 11 estimates an absolute distance between the reference point 100 and the to-be-positioned device 2 at each of a current time point and a number (N) of consecutive previous time points before the current time point, where N is an integer smaller than n, n is a non-negative integer indicating a total number of time points accumulated since the to-be-positioned device 2 starts to move, the current time point is defined as the $(n)^{th}$ time point, a $(j)^{th}$ time period is defined as a time period between $(j-1)^{th}$ and $(j)^{th}$ time points, and j is an integer ranging from 1 to n. Herein, each consecutive two of the time points are spaced by a unit time difference.

In step S32, when N≥1, the orientation estimating unit 12 estimates a unit vector of a movement direction of the to-be-positioned device 2 in each of $(n-N+1)^{th}$ to $(n)^{th}$ time periods. Particularly, the orientation estimating unit 12 estimates an angle between the movement direction and a reference direction so as to obtain the unit vector of the movement direction.

In step S33, the processing unit 13 estimates coordinates of a location of the to-be-positioned device 2 at the $(n)^{th}$ time point based on the absolute distance(s) estimated in step S31, the unit vector(s) of the movement direction of the to-be-positioned device 2 in step S32, and coordinates of a location of the to-be-positioned device 2 at each of the number (N) of the consecutive previous time points.

It should be noted that the coordinates in this embodiment are in a two-dimensional Cartesian coordinate system, the reference point 100 is given as the origin of the two-dimensional Cartesian coordinate system, and the reference direction used in step S32 is parallel to an X-axis of the two-dimensional Cartesian coordinate system.

In particular, step S33 includes the following sub-steps S331–S333. In sub-step S331, the processing unit 13 calculates a moving distance ($\alpha_n$) that the to-be-positioned device 2 has moved in the $(n)^{th}$ time period from the $(n-1)^{th}$ time point to the $(n)^{th}$ time point according to the following equation:

$$\alpha_n = \underset{\alpha}{\mathrm{argmin}}\left[(\alpha - \alpha_{n-1})^2 + \sum_{i=n-N\sim n-1}\left(\alpha^2 + 2\alpha \vec{d}_{i+1}^T \vec{x}_i - \varepsilon_{i+1}\right)^2\right],$$

where $\alpha_{n-1}$ represents a moving distance that the to-be-positioned device 2 has moved in an $(n-1)^{th}$ time period, $\vec{d}_{i+1}$ represents a unit vector of a movement direction of the to-be-positioned device 2 in an $(i+1)^{th}$ time period, and $\vec{x}_i$, $\vec{x}_{i+1}$ represent coordinate vectors of the to-be-positioned device 2 with respect to the reference point 100 respectively at an $(i)^{th}$ time point and an $(i+1)^{th}$ time point, and $\varepsilon_{i+1} = |\vec{x}_{i+1}|^2 - |\vec{x}_i|^2$.

In sub-step S332, the processing unit 13 determines a measurement vector ($z_n$) associated with the location of the to-be-positioned device 2 by the following equation:

$$z_n = \begin{bmatrix} \varepsilon_n \\ \vdots \\ \varepsilon_{n-N+1} \\ r_n^2 \end{bmatrix} = \begin{bmatrix} \alpha_n^2 + 2\alpha_n \vec{d}_n^T \vec{x}_{n-1} \\ \vdots \\ \alpha_{n-N+1}^2 + 2\alpha_{n-N+1} \vec{d}_{n-N+1}^T \vec{x}_{n-N} \\ \vec{x}_n^T \vec{x}_n \end{bmatrix} + v,$$

where $r_n$ represents the distance between the reference point 100 and the location of the to-be-positioned device 2 at the $(n)^{th}$ time point, v represents an $(N+1) \times 1$ measurement noise vector during measurement of the distance ($r_n$). It should be noted that $\alpha_n$ satisfies one of the following conditions:

when $\varepsilon_n > 0$, $\alpha_n$ is a positive value; and when $\vec{d}_n^T \vec{x}_n < 0$ and $\varepsilon_n \geq 0$, $\alpha_n$ has two positive value solutions and the smaller one of the solutions of $\alpha_n$ is selected as the moving distance.

In this embodiment, the processing unit 13 determines $\alpha_n$ via a filtering process such as Kalman filtering.

In sub-step S333, the processing unit 13 determines a status vector ($x_n$) associated with the moving distance of the to-be-positioned device 2 in the $(n)^{th}$ time period by the following equation so as to obtain the coordinates of the location of the to-be-positioned device 2 at the $(n)^{th}$ time point in the two-dimensional Cartesian coordinate system:

$$x_n = \begin{bmatrix} x_n \\ y_n \\ \alpha_n \end{bmatrix} = \begin{bmatrix} 1 & 0 & d_n^x \\ 0 & 1 & d_n^y \\ 0 & 0 & 1 \end{bmatrix} \begin{bmatrix} x_{n-1} \\ y_{n-1} \\ \alpha_{n-1} \end{bmatrix} + w,$$

where $(x_n, y_n)$ represents the coordinates of the location of the to-be-positioned device 2 at the $(n)^{th}$ time point in the two-dimensional Cartesian coordinate system, $x_{n-1}$ represents an X-coordinate of the location of the to-be-positioned device 2 at $(n-1)^{th}$ time point, $y_{n-1}$ represents a Y-coordinate of the location of the to-be-positioned device 2 at the $(n-1)^{th}$ time point, $d_n^x$ represents a component of the movement direction of the to-be-positioned device 2 within the $(n)^{th}$ time period relative to the X-axis, $d_n^y$ represents a component of the movement direction of the to-be-positioned device 2 within the $(n)^{th}$ time period relative to a Y-axis of the two-dimensional Cartesian coordinate system, and w represents a $3 \times 1$ matrix noise vector in the $(n)^{th}$ time period.

It should be noted that, only one reference point 100 is utilized to obtain the location of the to-be-positioned device 2 in this embodiment, and more reference points (except for the origin) in the two-dimensional Cartesian coordinate system may be employed in other embodiments of this disclosure to increase estimation accuracy of the location of the to-be-positioned device 2. When more than one reference points are employed, the distance estimating unit 11 estimates an absolute distance between each of the reference points and the to-be-positioned device 2 at each of the current time point and a number (N) of consecutive previous time points. Further, the processing unit 13 estimates the coordinates of the location of the to-be-positioned device 2 at the $(n)^{th}$ time point based on the absolute distance(s) estimated in step S31, the unit vector(s) of the movement direction of the to-be-positioned device 2 in step S32, and the coordinates of the location of the to-be-positioned device 2 at each of the number (N) of the consecutive previous time points. Accordingly, with more than one reference point, the coordinates of the location of the to-be-positioned device 2 at the $(n)^{th}$ time point calculated in step S32 are relatively accurate.

Referring back to FIG. 1, the to-be-positioned device 2 (i.e., the automatic guided vehicle) is first disposed at an initial position close to a substantial ellipse track 200 which the to-be-positioned device 2 is about to move along, and starts to move toward the track 200 at $0^{th}$ time point (i.e. n=0). The positioning system 1 implements the method for positioning the to-be-positioned device 2 that starts to move from the initial position in the two-dimensional X-Y Cartesian coordinate system, and the estimated movement path of the to-be-positioned device 2 at each time point is plotted in FIG. 4 by a computing device such as a personal computer.

Figure 4:
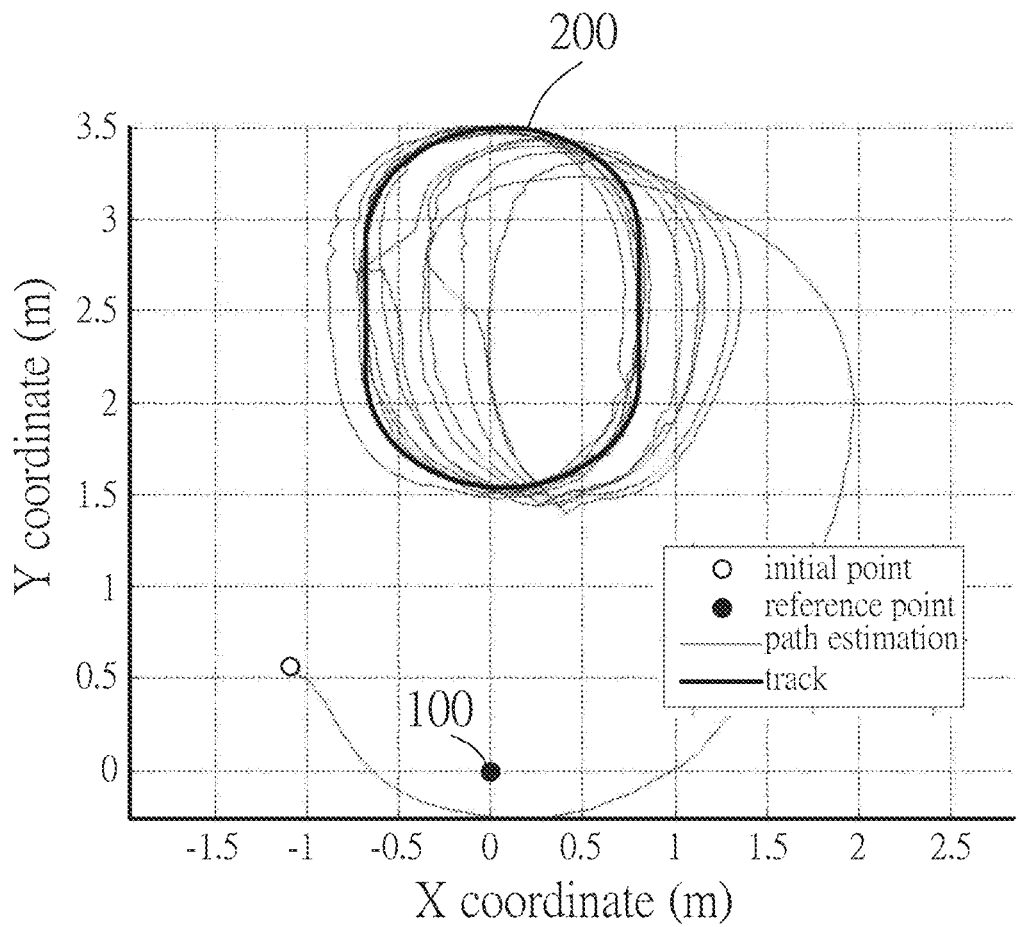
FIG. 4 is a schematic diagram exemplarily illustrating a moving track of the to-be-positioned device in a two-dimensional Cartesian coordinate system obtained using the method of the embodiment.

As can be seen in FIG. 4, although an estimated initial point (indicated by a circle) of the to-be-positioned device 2 is not accurately located in the two-dimensional Cartesian coordinate system as compared to an actual position thereof shown in FIG. 1, through the abovementioned equations and calculations, the estimated coordinates of the location of the to-be-positioned device 2 will become more and more accurate along with increase of the total number (n) of the time points accumulated since the to-be-positioned device 2 starts to move, and may have an accuracy rate of approximately 90% as compared to the actual position thereof.

It should be noted that the coordinates may be in a three-dimensional X-Y-Z Cartesian coordinate system in other embodiments of this disclosure, and the reference point 100 is given as the origin (0, 0, 0) of the three-dimensional Cartesian coordinate system.

In a case that the coordinates are in a three-dimensional Cartesian coordinate system (not shown), the processing unit 13 is programmed to determine, in a similar manner, a status vector ($x_n$) associated with the moving distance of the to-be-positioned device 2 in the $(n)^{th}$ time period by the following equation:

$$x_n = \begin{bmatrix} x_n \\ y_n \\ z_n \\ \alpha_n \end{bmatrix} = \begin{bmatrix} 1 & 0 & 0 & d_n^x \\ 0 & 1 & 0 & d_n^y \\ 0 & 0 & 1 & d_n^z \\ 0 & 0 & 0 & 1 \end{bmatrix} \begin{bmatrix} x_{n-1} \\ y_{n-1} \\ z_{n-1} \\ \alpha_{n-1} \end{bmatrix} + w,$$

where ($x_n, y_n, z_n$) represents the coordinates of the location of the to-be-positioned device 2 at the $(n)^{th}$ time point in the three-dimensional Cartesian coordinate system, $x_{n-1}$ represents an X-coordinate of the location of the to-be-positioned device 2 at the $(n-1)^{th}$ time point, $y_{n-1}$ represents a Y-coordinate of the location of the to-be-positioned device 2 at the $(n-1)^{th}$ time point, $z_{n-1}$ represents a Z-coordinate of the location of the to-be-positioned device 2 at the $(n-1)^{th}$ time point, $d_n^x$ represents a component of the movement direction of the to-be-positioned device 2 within the $(n)^{th}$ time period relative to a X-axis of the three-dimensional Cartesian coordinate system, $d_n^y$ represents a component of the movement direction of the to-be-positioned device 2 within the $(n)^{th}$ time period relative to a Y-axis of the three-dimensional Cartesian coordinate system, $d_n^z$ represents a component of the movement direction of the to-be-positioned device 2 within the $(n)^{th}$ time period relative to a Z-axis of the three-dimensional Cartesian coordinate system, and w represents a 4×1 matrix noise vector in the $(n)^{th}$ time period from the $(n-1)^{th}$ time point to the $(n)^{th}$ time point.

In view of above, the method for positioning a to-be-positioned device 2 can obtain the coordinates of the to-be-positioned device 2 at the $(n)^{th}$ time point with reference to only one reference point 100, and can locate the to-be-positioned device 2 in indoor environments without using GPS.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for positioning a to-be-positioned device, the method to be implemented by a positioning system that includes a distance estimating unit, an orientation estimating unit disposed on the to-be-positioned device, and a processing unit coupled to the distance estimating unit and the orientation estimating unit, the method comprising the steps of:
    a) estimating, by the distance estimating unit, an absolute distance between a reference point and the to-be-positioned device at each of a current time point and a number (N) of consecutive previous time points before the current time point, where N is an integer smaller than n, n is a non-negative integer indicating a total number of time points accumulated since the to-be-positioned device starts to move, the current time point is defined as the $(n)^{th}$ time point, a $(j)^{th}$ time period is defined as a time period between $(j-1)^{th}$ and $(j)^{th}$ time points, and j is an integer ranging from 1 to n;
    b) estimating, by the orientation estimating unit, a unit vector of a movement direction of the to-be-positioned device in each of $(n-N+1)^{th}$ to $(n)^{th}$ time periods; and
    c) estimating, by the processing unit, coordinates of a location of the to-be-positioned device at the $(n)^{th}$ time point based on the absolute distance(s) estimated in step a), the unit vector(s) estimated in step b), and coordinates of a location of the to-be-positioned device at each of the number (N) of the consecutive previous time points.

2. The method of claim 1, wherein in step c), the processing unit is programmed to calculate a moving distance ($\alpha_n$) that the to-be-positioned device has moved in the $(n)^{th}$ time period according to the following equation:

$$\alpha_n = \underset{\alpha}{\operatorname{argmin}}\left[ (\alpha - \alpha_{n-1})^2 + \sum_{i=n-N-n-1} \left( \alpha^2 + 2\alpha \vec{d}_{i+1}^T \vec{x}_i - \varepsilon_{i+1} \right)^2 \right],$$

where $\alpha_{n-1}$ represents a moving distance that the to-be-positioned device has moved in the $(n-1)^{th}$ time period, $\vec{d}_{i+1}$ represents a unit vector of a movement direction of the to-be-positioned device in the $(i+1)^{th}$ time period, $\vec{x}_i$ and $\vec{x}_{i+1}$ represent coordinate vectors of the to-be-positioned device with respect to the reference point respectively at the $(i)^{th}$ and $(i+1)^{th}$ time points, and $\varepsilon_{i+1} = |\vec{x}_{i+1}|^2 - |\vec{x}_i|^2$.

3. The method of claim 2, wherein $\alpha_n$ satisfies one of the following conditions:
    when $\varepsilon_n > 0$, $\alpha_n$ is a positive value; and
    when $\vec{d}_n^T \vec{x}_n < 0$ and $\varepsilon_n < 0$, $\alpha_n$ has two positive value solutions and the smaller one of $\alpha_n$ is selected as the moving distance.

4. The method of claim 3, wherein in step c), the coordinates are in a two-dimensional X-Y Cartesian coordinate system, and the reference point is given as the origin of the Cartesian coordinate system,
    wherein, in step b), the orientation estimating unit is configured to estimate an angle between the movement direction and a reference direction that is parallel to an X-axis of the Cartesian coordinate system, so as to obtain the unit vector of the movement direction.

5. The method of claim 4, wherein, step c), the processing unit is programmed to further determine a measurement vector ($z_n$) associated with the location of the to-be-positioned device, and a status vector ($x_n$) associated with the moving distance of the to-be-positioned device in the $(n)^{th}$ time period by the following equations:

$$z_n = \begin{bmatrix} \varepsilon_n \\ \vdots \\ \varepsilon_{n-N+1} \\ r_n^2 \end{bmatrix} = \begin{bmatrix} \alpha_n^2 + 2\alpha_n \vec{d}_n^T \vec{x}_{n-1} \\ \vdots \\ \alpha_{n-N+1}^2 + 2\alpha_{n-N+1} \vec{d}_{n-N+1}^T \vec{x}_{n-N} \\ \vec{x}_n^T \vec{x}_n \end{bmatrix} + v$$

-continued $$x_n = \begin{bmatrix} x_n \\ y_n \\ \alpha_n \end{bmatrix} = \begin{bmatrix} 1 & 0 & d_n^x \\ 0 & 1 & d_n^y \\ 0 & 0 & 1 \end{bmatrix} \begin{bmatrix} x_{n-1} \\ y_{n-1} \\ \alpha_{n-1} \end{bmatrix} + w,$$

where $(x_n, y_n)$ represents the coordinates of the location of the to-be-positioned device at the $(n)^{th}$ time point in the Cartesian coordinate system, $r_n$ represents a distance between the reference point and the location of the to-be-positioned device at the $(n)^{th}$ time point, v represents an $(N+1) \times 1$ measurement noise vector during measurement of the distance $(r_n)$, $x_{n-1}$ represents an X-coordinate of the location of the to-be-positioned device at the $(n)^{th}$ time point, $y_{n-1}$ represents a Y-coordinate of the location of the to-be-positioned device at the $(n)^{th}$ time point, $d_n^x$ represents a component of the movement direction of the to-be-positioned device within the $(n)^{th}$ time period relative to the X-axis, $d_n^y$ represents a component of the movement direction of the to-be-positioned device within the $(n)^{th}$ time period relative to a Y-axis of the Cartesian coordinate system, w represents a $3 \times 1$ matrix noise vector in the $(n)^{th}$ time period from the $(n-1)^{th}$ time point to the $(n)^{th}$ time point.

6. The method of claim 3, wherein in step c), the processing unit determines $\alpha_n$ and $x_n$ via a filtering process.

7. The method of claim 3, wherein in step c), the coordinates are in a three-dimensional X-Y-Z Cartesian coordinate system, and the reference point is given as the origin of the Cartesian coordinate system, wherein, in step b), the orientation estimating unit is configured to estimate an angle between the movement direction and a reference direction that is parallel to an X-axis of the Cartesian coordinate system, so as to obtain the unit vector of the movement direction.

8. The method of claim 7, wherein, in step c), the processing unit is programmed to further determine a measurement vector $(z_n)$ associated with the location of the to-be-positioned device and a status vector $(x_n)$ associated with the moving distance of the to-be-positioned device in the $(n)^{th}$ time period by the following equations:

$$z_n = \begin{bmatrix} \varepsilon_n \\ \vdots \\ \varepsilon_{n-N+1} \\ r_n^2 \end{bmatrix} = \begin{bmatrix} \alpha_n^2 + 2\alpha_n \vec{d}_n^T \vec{x}_{n-1} \\ \vdots \\ \alpha_{n-N+1}^2 + 2\alpha_{n-N+1} \vec{d}_{n-N+1}^T \vec{x}_{n-N} \\ \vec{x}_n^T \vec{x}_n \end{bmatrix} + v$$

$$x_n = \begin{bmatrix} x_n \\ y_n \\ z_n \\ \alpha_n \end{bmatrix} = \begin{bmatrix} 1 & 0 & 0 & d_n^x \\ 0 & 1 & 0 & d_n^y \\ 0 & 0 & 1 & d_n^z \\ 0 & 0 & 0 & 1 \end{bmatrix} \begin{bmatrix} x_{n-1} \\ y_{n-1} \\ z_{n-1} \\ \alpha_{n-1} \end{bmatrix} + w,$$

where $(x_n, y_n, z_n)$ represents the coordinates of the location of the to-be-positioned device at the $(n)^{th}$ time point in the Cartesian coordinate system, and $r_n$ represents a distance between the reference point and the location of the to-be-positioned device at the $(n)^{th}$ time point, v represents an $(N+1) \times 1$ measurement noise vector during measurement of the distance $(r_n)$, $x_{n-1}$ represents an X-coordinate of the location of the to-be-positioned device at the $(n)^{th}$ time point, $y_{n-1}$ represents a Y-coordinate of the location of the to-be-positioned device at the $(n)^{th}$ time point, $z_{n-1}$ represents a Z-coordinate of the location of the to-be-positioned device at the $(n)^{th}$ time point, $d_n^x$ represents a component of the movement direction of the to-be-positioned device within the $(n)^{th}$ time period relative to the X-axis, $d_n^y$ represents a component of the movement direction of the to-be-positioned device within the $(n)^{th}$ time period relative to a Y-axis of the Cartesian coordinate system, $d_n^z$ represents a component of the movement direction of the to-be-positioned device within the $(n)^{th}$ time period relative to a Z-axis of the Cartesian coordinate system, and w represents a $4 \times 1$ matrix noise vector in the $(n)^{th}$ time period from the $(n-1)^{th}$ time point to the $(n)^{th}$ time point.

9. The method of claim 8, wherein in step c), the processing unit determines $\alpha_n$ and $x_n$ via a filtering process.

* * * * *